United States Patent
Gupta et al.

(10) Patent No.: US 8,135,699 B2
(45) Date of Patent: Mar. 13, 2012

(54) SUMMARIZATION SYSTEMS AND METHODS

(76) Inventors: Puneet K. Gupta, Newark, CA (US); Mark A. Boys, Aromas, CA (US)

(*) Notice: Subject to any disclaimer, the term of this patent is extended or adjusted under 35 U.S.C. 154(b) by 232 days.

(21) Appl. No.: 11/472,884

(22) Filed: Jun. 21, 2006

(65) Prior Publication Data
US 2007/0299859 A1 Dec. 27, 2007

(51) Int. Cl.
*G06F 7/00* (2006.01)
(52) U.S. Cl. .......... 707/708; 707/705; 704/240; 725/32; 348/211.12
(58) Field of Classification Search .................... 707/708
See application file for complete search history.

(56) References Cited

U.S. PATENT DOCUMENTS

| | | | | |
|---|---|---|---|---|
| 5,235,651 A | * | 8/1993 | Nafarieh | 382/290 |
| 5,557,515 A | * | 9/1996 | Abbruzzese et al. | 705/9 |
| 6,549,577 B2 | * | 4/2003 | Florencio et al. | 375/240.21 |
| 2002/0078090 A1 | * | 6/2002 | Hwang et al. | 707/513 |
| 2002/0147592 A1 | * | 10/2002 | Wilmot et al. | 704/270.1 |
| 2005/0177739 A1 | * | 8/2005 | Ferlitsch et al. | 713/189 |
| 2006/0184366 A1 | * | 8/2006 | Hidaka et al. | 704/240 |
| 2006/0212897 A1 | * | 9/2006 | Li et al. | 725/32 |

* cited by examiner

*Primary Examiner* — Wilson Lee
*Assistant Examiner* — Tuan-Khanh Phan
(74) *Attorney, Agent, or Firm* — Donald R. Boys; Central Coast Patent Agency, Inc.

(57) ABSTRACT

A server-side summarization system includes a function for acquiring material to be summarized, along with source information about the material, a converter for converting the acquired material to machine-readable form, if not in that form when acquired, a summarizer for creating a summary from the acquired material, and a storage function for storing a copy of the acquired material and the summary created as separate files, associated and cross-referenced using the source information.

1 Claim, 5 Drawing Sheets

SUMMARIZATION SYSTEMS AND METHODS

BACKGROUND OF THE INVENTION

1. Field of the Invention

The present invention is in the area of computerized and network-enabled systems, and pertains more particularly to systems for receiving and processing information, and returning summaries of various sorts for various purposes.

2. Discussion of the State of the Art

Computerized summarization systems of various sorts are well-known in the art, and typically consist of a means of entering information, and treating the entered information in machine-readable format to reduce the bulk of the information without losing the most important meanings and aspects of the original.

SUMMARY OF THE INVENTION

In an embodiment of the present invention a server-side summarization system is provided, comprising a function for acquiring material to be summarized, along with source information about the material, a converter for converting the acquired material to machine-readable form, if not in that form when acquired, a summarizer for creating a summary from the acquired material, and a storage function for storing a copy of the acquired material and the summary created as separate files, associated and cross-referenced using the source information.

BRIEF DESCRIPTION OF THE DRAWING FIGURES

DETAILED DESCRIPTION OF EMBODIMENTS OF THE INVENTION

Figure 1:
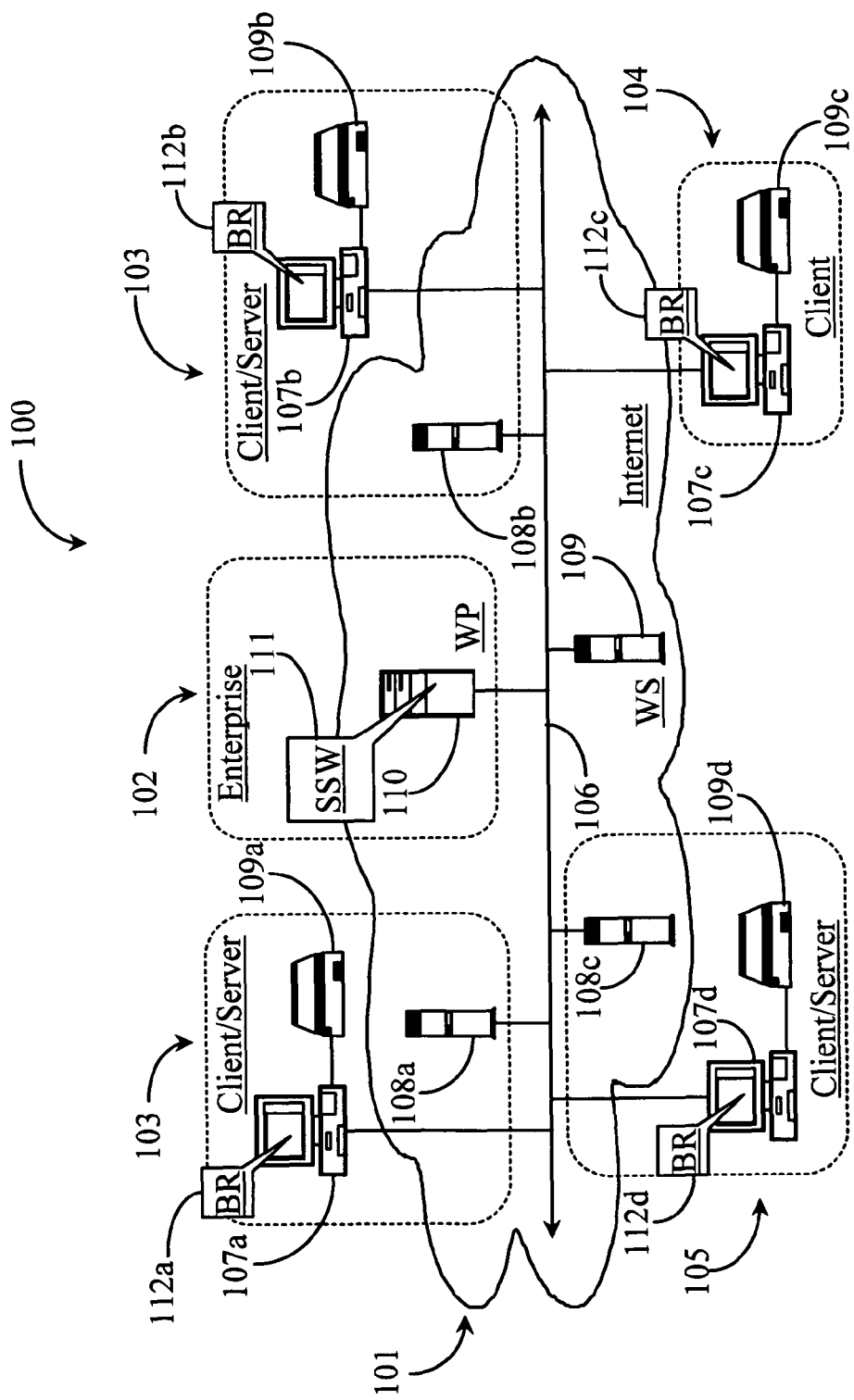
FIG. 1 is an architectural overview of a network environment practicing document summarization according to an embodiment of the present invention.

FIG. 1 is an architectural overview of a network 100 wherein document summarization may be practiced according to embodiments of the present invention. Network 100 is represented by a cloud and further defined by a network backbone 106, and in a preferred embodiment is the well-known Internet network. Backbone 106 within network 100 represents all of the lines, equipment and access points making up the network as a whole. It will be appreciated by the skilled artisan that network 100 may include connected sub networks which may include local area networks (LANs), wide area networks (WANs) and private or public Intranets.

In one embodiment an enterprise node 102 in network 100 provides document summarization services through a Web Server (WS) 110 that is connected to backbone 106. WS 110 is accessible to clients subscribing to or otherwise authorized to access document summarization services, and executes summarization software (SSW) 111. SSW 111 in this embodiment is a server-based application suite that automatically creates document summaries for users who submit documents or provide location information for documents to server 110, enabling server access to such documents. SSW 111 also performs other tasks, which are related to summary management and distribution, which may be at user request and direction.

A client 101 has connection to backbone 106 by one of several possible network access methods. In this example client 101 has a desktop computer 107a connected by a broadband Internet link to backbone 106. The connection may be digital services line (DSL), integrated services digital network (ISDN), cable, satellite, or some other network connection apparatus and method. Computer 107a may be a laptop computer or any other network-capable appliance with a display and a browser application that may access server 110. Computer 107a executes browser application 112a which provides general network access and navigation. A broadband connection is preferred, but a dialup Internet access connection may be used without departing from the spirit and scope of the present invention wherein network 100 is the Internet. The connecting network may be any telephony carrier network including the public switched telephone network (PSTN) or a wireless carrier network.

Computer 107a in this example has an optical character recognition (OCR) scanner 109a connected as a peripheral device. Scanner 109a may be used in one embodiment to scan documents onto computer 107a for upload to server 110 for summarizing. Also in one embodiment documents available to computer 107a may be summarized by server 110 without requiring upload to the server. Client 101 also maintains a network-connected server 108a that is accessible to other users over the network. Client 101 may therefore be an enterprise providing services and/or products to customers. A client 103 and a client 105 are illustrated and also have network connection to backbone 106 as described above. Client 103 is similar to station 101 in that a computer 107b running a browser instance 112b is provided as well as an OCR scanner 109b. Client 103 may be an enterprise as was described above with respect to client 101. Furthermore, client 105 is similarly adapted as described above with respect to client 101 including a computer 107d, a scanner 109d, a BR instance 112d running on computer 107d and an enterprise server 108c.

Clients, 103, and 105 may subscribe to the services provided by enterprise 102 and may access those services by accessing server 110 with browser interfaces 112a, 112b, and 112d. A browser plug-in such as an active x control, a java-based plug-in, a direct x plug-in, asynchronous JavaScript and XML, (AJAX), or some other plug-in component may be temporarily or permanently downloaded to each of computers 107a, 107b, and 107d when server 110 is accessed and the user is authenticated for first time use of the service. In the case of clients, 103, and 105, document summarization as provided by SSW 111 may be performed on any electronic documents that may be uploaded to the server from a network-capable appliance such as from computers 107a, 107b, and 107d. Document summarization may also be performed on documents that are resident on a connecting appliance like computer 107a without requiring the documents to be uploaded. In this case, the documents for summarizing may be dragged and dropped into a shared folder that server 110 is authorized to access over network 100.

As described further above each station 101, 103, and 105 have enterprise servers 108a, 108b, and 108c adapted to hold and serve enterprise documents internally and to serve electronic information pages using hypertext markup language (HTML) or an extension such as SHTML, XML, or the like. Internal documents may include HTML-based information pages addressed in the server, and other document types that may be stored at the servers. These may include extensions such as .doc, .pdf, or any known extension for any known word processing application used to create those documents. In this example, clients 101, 103, and 105 may authorize server 110 aided by software 111 to search and summarize any documents or electronic information pages maintained in those enterprise servers 108a-108c. Server 110 accesses those servers over network 100 based on a request from the appropriate client 101, 103, or 105.

Document summaries created from resident documents accessed remotely by server 110 may be stored on the same system that holds the documents that were summarized. Server 110 may associate those summaries to the full-text versions of those documents and may provide notification of the existence of a summary version of a full text document to anyone operating on the network that has requested access to a document that has a summary version associated with it.

In one embodiment, server 110 may keep stored document summaries on its own data storage system and may provide network links to those summaries. The links may be associated with the full text versions of the summaries at any accessible location of those documents. It is emphasized that documents and their summaries need not be stored on a same computing system, server, or hard drive. It is also emphasized that links to the stored summaries may be placed in a Web page, in a full text document that has been summarized, or simply in an accessible file folder represented as a shortcut icon that is executable as long as the searched system has connection to the network.

A client 104 includes a computing system 107c and a connected OCR scanner 109c. Computing system 107c has a browser application 112c adapted for browsing the network. Client 104 may be a private consumer rather than an enterprise maintaining a document and/or Web server. Client 104 may subscribe to services offered through server 110 and may have documents summarized in the same manners described with respect to the other enterprise clients. For example client 104 may scan documents into computing system 107c and have them summarized on the computing system if the system is online and connected to server 110.

In one embodiment, the scanned documents may be uploaded to server 110 for summarizing. Word documents such as those with the extensions .doc, .pdf, or other known extensions may be uploaded to server 110 from computer 107c for summarizing. Those same documents may be summarized on computing system 107c by dragging them from their original folder and dropping them into a shared folder made accessible to server 110 or a special window that may be part of a browser plug-in adapted to enable server 110 to gain limited control over the computer for the purpose of summarizing those documents.

A user operating computer 107c and in session with server 110 using browser 112c may request a summary of a document available through an electronic information page hosted on a network-connected server such as one illustrated in this example as Web server (WS) 109. In this case, the user submits a universal resource locator (URL) including universal resource indicator (URI) to the electronic document and the server downloads the document in order to summarize the document. The server may then send the summary document to the user or make it available to the user at the server depending on enterprise rules and whether the requested document has been made freely available for download. The server might also summarize an electronic information page that is accessible by URL.

In one embodiment, server 110 with the aid of SSW 111 may access documents available through the network and summarize those documents storing the summaries in a searchable data storage facility. Links may be made available to those documents through a search engine as a result of a keyword or phrase entry and submission through the search interface. For example, a third party search service may provide search result pages containing links to electronic information pages containing documents that have been summarized in the past. Clickable links to those document summaries may be provided along with the links to the full text documents on the search result page.

As more documents are summarized the search results served will provide more summary links to those full text documents. There may be some rules in place to determine which documents available through the network should be summarized, such as for example, popularity (frequently accessed), class (education, technical paper, etc.), and so on. Research papers and other technology white papers may be good candidates for document summaries. User guides, product manuals, tutorials, public information works, and other frequently accessed materials may be good candidates for summarizing. Each document summary accessed from a search results page may also contain a hyperlink to the full text version of the document summary. Summary formats may vary according to the nature of a document. Summary outlines, searchable indexes, graphics slide shows, and other tools may be provided to help a user determine whether to access a full document or not.

Figure 2:
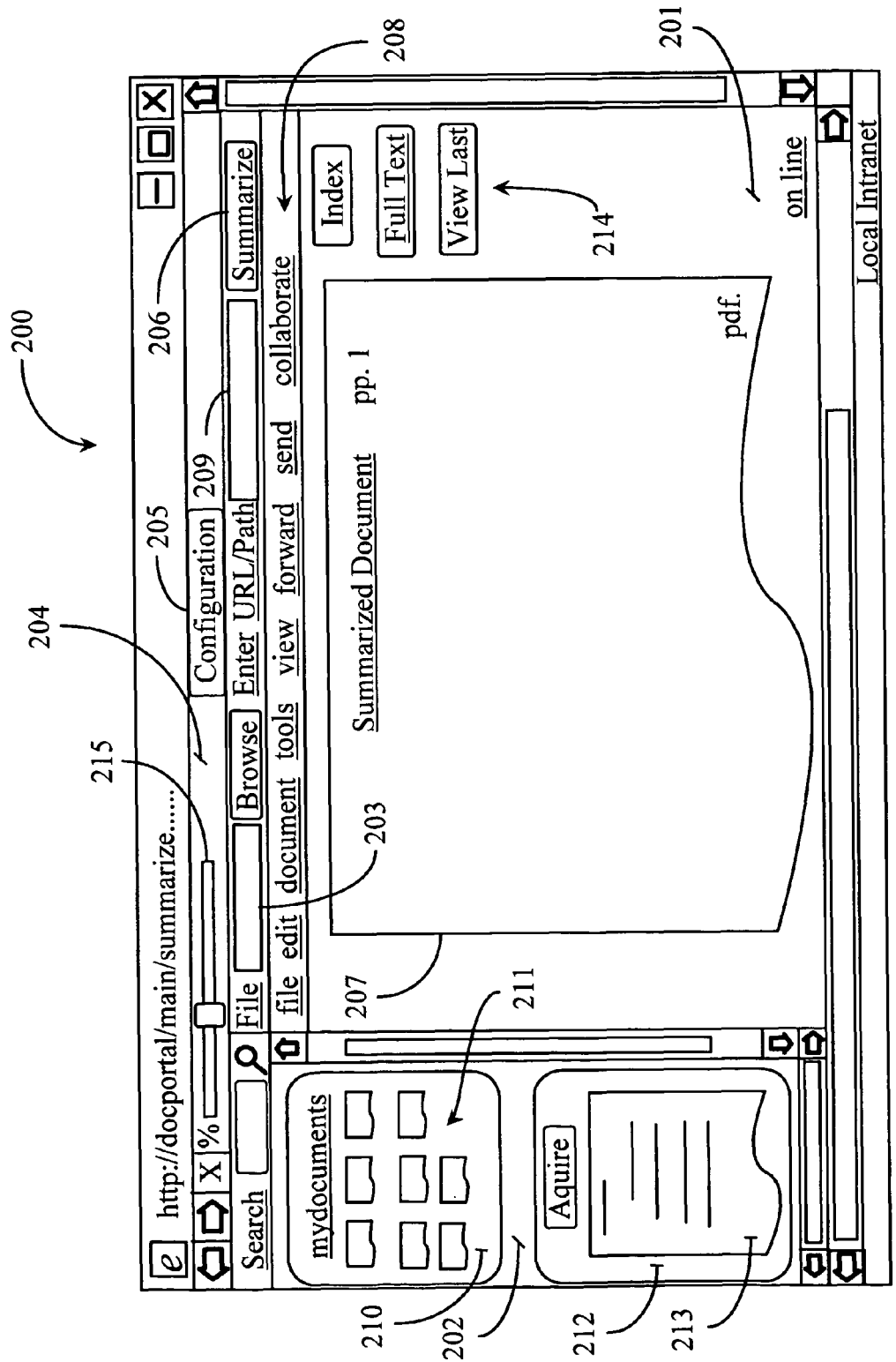
FIG. 2 is an exemplary screen shot of a browser window illustrating a summarization user interface according to an embodiment of the present invention.

FIG. 2 is an illustration of an interactive summarization user interface 200 according to an embodiment of the present invention. Interface 200 is provided in this example in the form of a browser window. In one embodiment, a browser plug-in may be provided to enable some or all of the capabilities of the service of the present invention, such as folder sharing. The server may perform local document summarizing on the user appliance if the user authorizes the process. In one embodiment, executable controls may also be temporarily downloaded to interface 200 if required, to perform certain server-side functions on the user device. Those controls may be discarded after the user logs off from the server.

In this example interface 200 is currently online and logged into an enterprise server providing the service of the present invention, such as server 110 of FIG. 1. Interface 200 has a toolbar 204 similar to any browser interface and may contain user-actionable icons and drop-down menus typical of a browser interface including text entry fields for entering URLs for navigation and for entering keywords or phrases for initiating data searches. A search window is illustrated in this example just below toolbar 204. A configuration icon 205 is provided to enable a first time user to configure the service of the invention for use. Configuration options may vary according to service plan.

Interface 200 has a file browse window 203 for finding documents for summarizing that are stored locally on the computing appliance or on a connected storage medium. Window 203 may also be used to find previously created document summaries. A data entry field 209 is provided on interface 200 and adapted for enabling a user to enter a URL and/or document path to a full text document that the user wants a summary of. A user may populate the entry field manually or a shortcut may be copied and pasted into the field. An icon labeled summarize 206 is provided adjacent to field 209. When the field is populated the user clicks on summarize to submit the network path to the service. In addition, user can select the level of summarization he wishes to extract from the source document. The level is selected via the use of a percentage slider bar to indicate a percentage level of desired summarization. The server aided by software navigates to the document and downloads the full text version and summarizes the document according to configured user preferences if any. If the user has not indicated exact preferences then a default summarization template may be used instead. In one embodiment, a percentage-based summarization scale 215 is provided within interface 200. Summarization scale 215 enables a user to pre-select a percentage of summarization for a document. Scale 215 may be graduated from 0% to 100% and a slider button on the scale may be manipulated to set a specific percentage.

Once the document has been acquired and summarized, then the summary version of the document may be sent to the user and may be displayed in a window 201 adapted for the purpose. In this example, page 1 of a .pdf file 207 is displayed. The user may scroll normally if there is more of the summary document than can be displayed on the screen. If the service already has a summarized version of a document that the user has provided the network path to, then the service may notify the user that a summary of the document is currently available for display. Once a summary is displayed, the user may save the summary locally and perform other common editing and file tasks that may be available with normal word processing software. Options 208 are provided in this example and may include drop-down menus file, edit, document, tools, view, forward, send, and collaborate. The option 208 labeled tools may include file converters or plug-in viewers for certain document types. The option 208 labeled view may offer different types of views of the summary based on any considerations. For example, a user may whish to view only a broad outline of the subject matter contained in the full text version of a document.

The user may activate, forward or deliver the document to a third party through email, file share program, or through some other resident application used to send messages and attachments. The user may select, collaborate and set up a session with one or more other connected appliances for the purpose of sharing the user screen and document display with other users. Icons 214 are provided conveniently within window 201 and are adapted to provide further options. One of icons 214 labeled index may allow the user to view an index of summarized documents currently available for view. One of icons 214 labeled full text enables the user to immediately retrieve a full text version of the summary from the server if desired. An icon 214 labeled view last enables the user to view the last summary acquired.

Interface 200 has a second scrollable sidebar area 202 adapted to contain more options. A window 210 is provided within area 202 and adapted to show a user the aggregate of document summaries previously created for the user. The window labeled mydocuments contains summary documents 211 that are available for viewing. Summary documents 211 may include links to the full text versions of those documents. The folder may be maintained at the server and made accessible to the user in personalized fashion such that only the user has authorization to access the folder.

Sidebar 202 also supports a scanner interface for acquiring documents by OCR scanner for summarizing. In this example, a page 213 of a document scanning into the computing appliance is illustrated. If the user is connected to the server while scanning is taking place the service may begin summarizing finished scans as soon as they are completely scanned onto the appliance. The summarization process is flexible. If subsequent scanned and parsed pages indicate a shift in any completed portion of the summary that completed portion may be modified. This particular feature of the present invention provides for extracting an organized summary from an otherwise unorganized full text document. In other words, the summary software of the invention may be enabled to determine some priority in arrangement of different sections of a document depending upon what content a user is looking for. Interface 212 may support a single document scanner or a multiple document scanner without departing from the spirit and scope of the invention.

Through interface 200, a user may submit documents to the service over the network for summarizing or the user may allow the server to summarize documents on the user appliance without requiring any document transfer. After a session is complete, any downloaded utilities or plug-ins may be disposed of or rendered unusable. In another embodiment, a persistent browser plug-in may be provided using activeX™, directX™, Java™ bean, or one of many other known executables. The service of the invention is intended to support a variety of operating platforms including Windows™, Apple™, Linux™, and any other known operating platforms.

In an embodiment where the user is an operator of an enterprise station having a large cache of documents to summarize, the URL to the server or folder containing the documents may be submitted to the service at which time the server may navigate to the URL and search and summarize all of the documents in the cache. Multiple documents hosted by a server, contained in a file folder or referenced by a navigable directory may be summarized in one session. There are many possibilities. Using the invention in this way enables an enterprise to create and distribute many summary documents. One example may be a contract having many documents sections sent to a prospective buyer as a series of document summaries. The buyer may access the full-page versions at will if desired or may simply rely on summary versions for sections of lesser concern.

Figure 3:
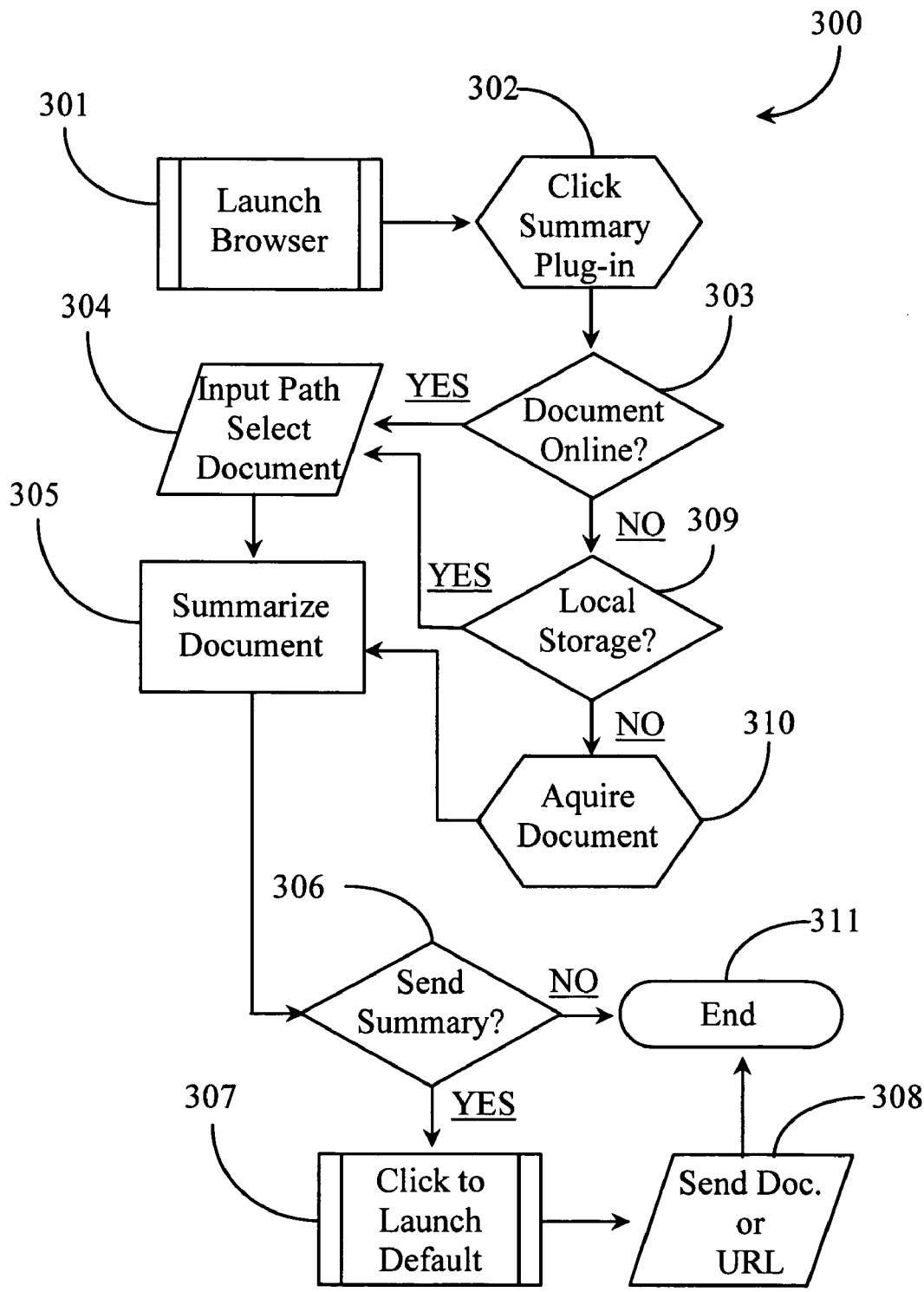
FIG. 3 is a process flow chart illustrating acts for summarizing a document according to embodiments of the present invention.

FIG. 3 is a process flow chart 300 illustrating acts for summarizing a document according to embodiments of the invention. At act 301 a user operating a network-capable appliance launches the network browser on the appliance. At act 302 the user connects to the server and logs onto the service by clicking on a plug-in icon conveniently placed into the browser. In one embodiment, there is no plug-in downloaded until the user navigates to and logs onto the server. In this case, the functionality for having documents summarized locally by the server over the network may be downloaded as an executable control, that executes and displays a user interface in the browser like interface 200 described earlier.

At act 303 the user determines if the document for summarizing is online. If at act 303 the target document for summarizing is online, then at act 304, the user provides the correct network path to the document by manually typing the path or by copying and pasting a shortcut to the document into a data field provided. At act 305, the user may click on summarize to have the service navigate to the URL retrieve the document and summarize it for the user. Step 305 includes making the summary version available to the user by sending it to the user over the network or by placing in a server-side folder personalized to the user wherein the user may access and download the document.

At act 306, the user has the option of sending the created summary to another user or users. If the user decides to send the summary to a third party or parties in act 306, then at act 307 the user clicks on forward or send to launch a preferred email application or some other communications application capable of handling attachments. If at act 306 the user does not want to forward or send the application then at act 311 the process ends. The user may view, edit and perform other tasks with the summarized document.

If at act 303 the user determines that the document to be summarized is not online, then the process proceeds to act 309 where the user determines if the document is in local storage. Local storage means that the document is on a storage medium accessible locally to the station or appliance the user is operating. The storage may be internal or peripherally accessible to the network-connected appliance. At act 309 if the document is in local storage, then the process resolves back to act 304 where the user may submit the document to the server through a file share utility or the user may select the document and drags it into a special share folder accessible to the summarizing software running server side.

In one embodiment, the user may copy a shortcut to the document and submit the shortcut to the server so that the server may navigate to the document. In the latter cases the appliance hosting the document would have a network address such as a URL or URL and machine address. In a wireless embodiment, the server may be a corporate server connected to a local WAN and may have access to a local network supporting the hosting machine. There are many possibilities. At act 305, the document is summarized according to a default protocol or customized protocol if the user has pre-configured any preferences.

Still possible is that at act 309, the user determines that the document is not in local storage but may be acquired such as by scanning. In this case, the user acquires in the document at act 310. In some cases, a peripheral scanning device may be made accessible to the summarization software through the appliance operated by the user. An example might be a networked and shared enterprise scanning device capable of independent storing and, perhaps serving scanned documents. In the latter case, the device may have a network address or URL and the service may be authorized to access the scanning device over the network. Thus enabled, the server may also summarize the document at the scanning device. Likewise, the scanning device may be enabled to serve the full text document directly to the server upon request where it may be summarized at the server and sent to the authorizing user or otherwise made available to the authorizing user.

At act 306, after the document has been summarized, an option for sending the summarized version of the document to another party or parties may be presented to the user that ordered the summary. The summarized version might be sent by proxy from the server or if the summarized version is available on the users appliance then the user may send the document at the time the document displays on the user appliance. If at act 306 the user decides not to send a copy to another party or parties, then the process may end at act 311. If at act 306 the user decides to send the summary version to one or more parties, then at act 307 the user may click to send launching a default application. The default application may be an email application, a file sharing application, or some other messaging application capable of handling attachments. In one embodiment, a user may authorize the summary document to be distributed by proxy the user providing the recipient address or list of recipient addresses to the server.

At act 308, the summary document is sent to one or more intended recipients over the network. As described above, the document may be sent directly by the user or by proxy without the user actually taking possession of the document. After the document is distributed, the process may end for that document at act 311. A user may, of course, perform many other document management tasks such as ordering a re-summarization of a document according to an alternate criterion.

It will be apparent to one with skill in the art of network communication between nodes connected to an Internet or other network that the process of this example may include more or fewer acts than illustrated herein without departing from the spirit and scope of the present invention. For example, an optional act for editing a summary version of a full text document may be provided before act 306 if the summarized version is on the appliance of the user and if the summary version is an editable version. In some cases the summaries may be read only depending upon enterprise rules taking into account user preferences.

Act 306 may not be performed at all and other tasks not mentioned here may be contemplated without departing from the spirit and scope of the present invention. For example, an act may be provided before act 305 for pre-selecting a specific percentage of summarization for a document using a summarization scale like scale 215 described above. In this case, the act of pre-selecting a summary percentage may be inserted after acts 304 and 310, or after act 302 in this process. Pre-selection of a summary percentage is optional and a default percentage may be observed unless overridden by a user using the summarization scale. (not to limit the scope by illustrating the act at a certain position in the figure.).

Figure 4:
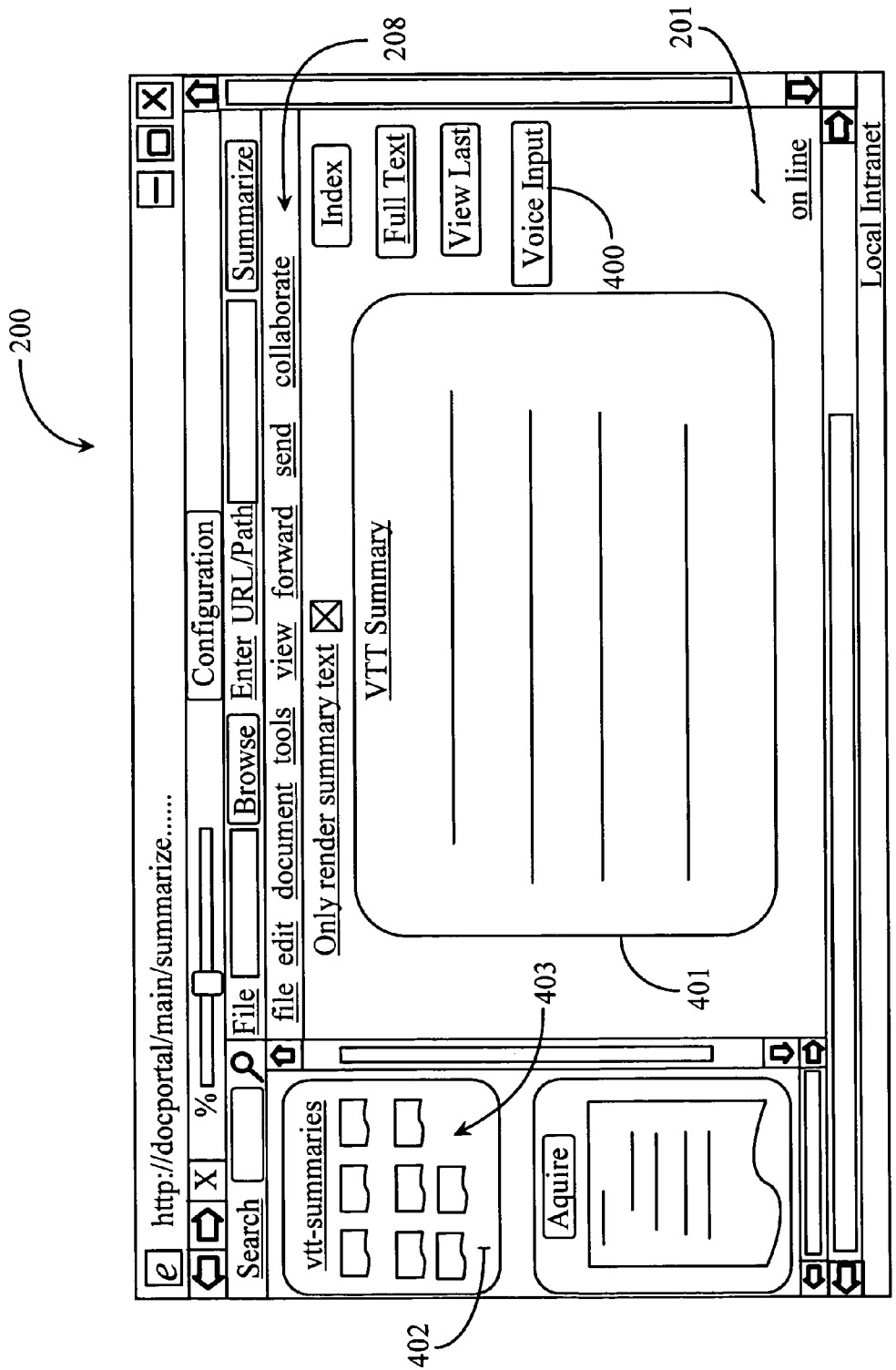
FIG. 4 is an exemplary screen shot of the user interface of FIG. 2 illustrating a voice to text summarization feature according to an embodiment of the present invention.

FIG. 4 is a representation of a screen shot of the user interface 200 of FIG. 2 illustrating a voice to text summarization feature according to an embodiment of the invention. In one embodiment of the invention, a voice to text summarization feature is provided that enables near real-time summarization of documents acquired by voice or audio input and translated to text using voice-to-text software.

Interface 200 contains many of the same elements described with respect to FIG. 2 above. Elements in this example that have already been described and that are not changed from their description in this example shall not be re-introduced. Screen 201 contains an icon 400 labeled voice input. Icon 400 may be selected to enable audio input into voice-to-text software provided on the user appliance or, in one embodiment, at the server. The voice-to text software is adapted as is generally known to translate the voice input to text.

In one embodiment, the user appliance is enabled for voice input to text translation. In this case, the voice input may be provided to the appliance anytime while online or offline and a text rendition of the voice input may be created for eventual summarizing by the service of the present invention. In another embodiment, the voice-to-text capability is provided server-side with the summarization software. In this embodiment, the user may call the server from the user appliance that is supporting interface 200 or from any a voice-capable appliance associated with and verifiably registered with the service. The user may then provide the voice input to the server. Voice over Internet protocol (VoIP) may be used to carry the voice input to the server sever. In another variation of this embodiment, the user's voice is recorded and converted to voice extensible markup language VXML or some other voice markup language and then recreated at the server as synthesized voice input that is then translated into text at the server.

In one embodiment text summarizing may begin at the server once sufficient voice input has been translated into text at the server and before all of the voice input has been received at the server. In an example of this embodiment, a user may speak into the connected appliance and at the server summarization begins almost immediately. In this case, the summarization text rendered is considered temporary and revisable as more input is received and main themes are added and perhaps reprioritized for summary rendition. Once a user is finished with voice input, a signal that the input stream has completed enables the summarizing engine to finalize the summary version of the full text translation. A user option is presented within screen 201 for only rendering summary text instead of a full text version of the document. In this case, the text rendered that ultimately will not be a part of the summary version is not discarded until the final summary version is decided or finalized. At that point the unneeded text may be discarded.

In this example, a voice-to-text (VTT) summary version of a translated document is displayed in screen 201 once it has been finalized by the system. A window 402 is provided in the browser sidebar area that is very similar to window 210 of FIG. 2 accept that it contains voice-to-text rendered summary documents 403 that were acquired through voice input. One with skill in the art of voice communications will appreciate that voice to text rendering may be performed over a network.

In one embodiment, the VTT software is local to the user appliance and the text translation is completed locally. In this case, the voice summarization may also begin before the voice input has finished as long as the user is connected to the server while the process continues. In this case, the text rendered may be submitted to the service over the network as it is being rendered and the summary may be created at the server. In another case, the server has access to a shared folder, or a special component of the VTT software that enables the summarizing engine to cooperate with the local instance of VTT software over the network. In this case the summary may be created by the server but rendered locally on the user appliance.

In one possible example, a user may attend a lecture equipped with a powerful handheld voice and network-capable appliance. In this case the user records the lecture live. The appliance may be connected wirelessly to the server hosting the summarization software. As the lecture is recorded the voice is translated into text and then summarized. when the lecture is complete, the user already has a summary text document highlighting the important parts of the lecture to use as notes. The lecture may be recorded off line, translated locally and then summarized when the user next connects to the server-based document summarizing service.

Figure 5:
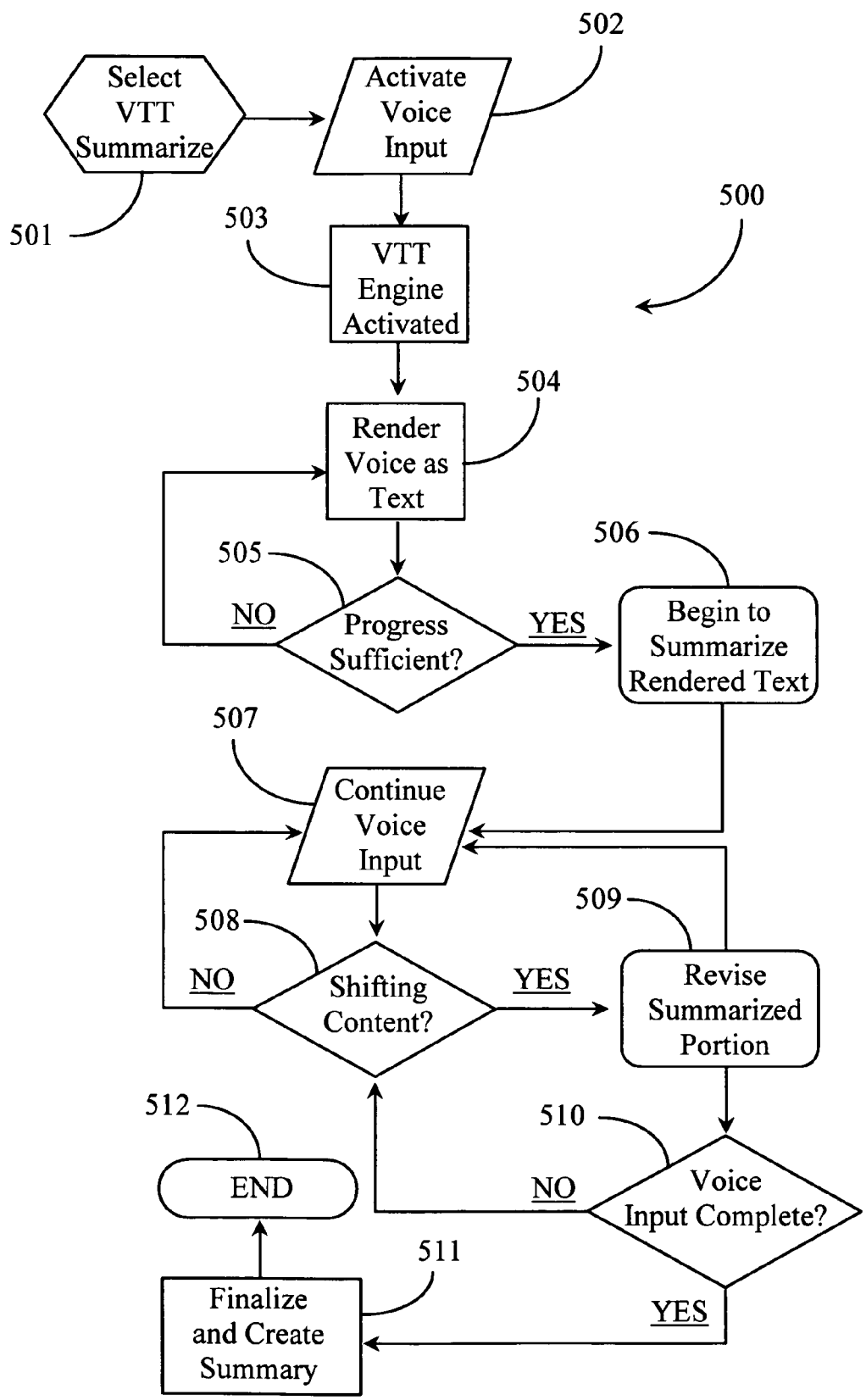
FIG. 5 is a process flow chart illustrating acts for summarizing voice to text in near real time according to an embodiment of the present invention.

FIG. 5 is a process flow chart 500 illustrating acts for summarizing voice to text in near real time according to an embodiment of the invention. At act 501, a user selects a voice to text summarizing option. In one embodiment, act 501 occurs while the user is connected online to the service of the present invention. At act 502, a voice input mechanism is activated, for example, a microphone and VTT software. At act 503, a voice-to-text translation engine is activated to begin translating the voice input and the voice input begins. The VTT software may, in one embodiment, be locally stored and executable from the user appliance.

At act 504, the VTT software begins rendering text from the voice input. At act 505, the service determines whether there is enough rendered text to begin summarization. If progress is not sufficient to begin summarizing, then the process loops back until there is sufficient text to begin. At act 505 once there is sufficient text rendered for summarizing, then at act 506 the document summarization process begins. It is important to note herein that all of the voice input is translated into text, but only some of the translated text will be included in the summary version. The user may elect to render both a full and summary version of the voice input session, or just to render a summary version discarding the text that is not required for the summary.

At act 507 voice input continues while summarization continues. At act 508 a determination is made whether the content being received and parsed for summary is shifting in theme, perhaps requiring some modification or reorganization in the rendered summary text. If not in act 508, then the process loops back to act 507 and then back to act 508 repeatedly until there is some shift in theme or new content that shifts away from the current summarized content. It is important to note herein that it is certainly possible that a summary may be completed without determining a positive at act 508. However, it is highly likely that a summary begun before all of the text has been acquired will need some revision before presentation. For example, with voice input is likely that a salient or important point may be brought up out of order of importance later in the input stream. This feature accounts for that possibility and enables the system to reprioritize the summary points. At act 508, if there is some shifting of content that might warrant a revision of the format of a summary and/or the text reserved for that summary then at act 509, the system may perform a revision or an adjustment to what has already been rendered as text and reserved for summary presentation.

At act 510, the system determines if the voice input has completed for a current session. If not, the process loops back to act 508 to determine if there is any shifting content that may require an adjustment to form, format or text already reserved for the summary document. If at act 510 it is determined that voice input is complete for that session, then at act 511, the summary rendering is finalized and the summary version is created for display, editing and other task considerations. At act 512, the summary document has been rendered so the process may terminate for that session. It is noted herein that the system continually revises its summary form, format and text while voice input continues and different themes, point, and ideas are interpreted until all of the input has been interpreted, at which time the complete summary is available. If at any time the session is interrupted, the summary version may still be created and presented based on the data that has been received.

In one embodiment, a user may add to a summary document by calling it up from storage and initiating a voice session associated with document editing. In this case, the summarizing engine may pick up where it left off and continue to build and revise the summary document as necessary based on the new content added. This particular feature of near-real-time summarization of translated voice is not available with current document summarization applications. By providing prioritization rules that also recognize key words and phrases that are used to describe importance, the engine can create a prioritized and organized summary almost immediately after the voice input session has completed. For example, the phrase "This is a key component" may be interpreted as it is used in association with one or more paragraphs just received. "The most important aspect" might also be recognized as a prioritization key in summarizing so that whatever text is associated with the phrase retains the priority in the summary document. The phrase, "A more important aspect is" . . . or "More importantly" . . . can also be integrated into a prioritization scheme to help create more organized summaries than would otherwise be rendered. This feature, although applicable to summaries created only from text documents, is particularly useful for creating summaries from rendered speech as the organization of voice input is typically not as evident as it is in a prepared text document.

It will be apparent to one with skill in the art that a capability of summarizing VTT renderings is not required in order to practice the present invention. However, the feature enables broadening of the types of input that may be summarized not limiting to complete text documents. In an additional embodiment, summarizing may be practiced according to the present invention in near real time wherein the input is a typing session. For example, a user may be creating a document while connected to the service in a session so that whenever the user stops typing input, a latest version of the summary may be presented following generally the process of FIG. 5 where the input is text input instead of voice input. Furthermore, a summary document may be voice synthesized and played back to a user or sent to the user as an executable voice file. There are many possibilities.

In another aspect of the invention enterprise server 110 is coupled to a data repository 113 (see FIG. 1) of considerable capacity, and all, or selected documents received and summarized are stored in this repository and cross-referenced. In an embodiment of the invention summaries may be provided free-of-charge to clients who access the service, but in exchange for information that facilitates the function of cross-referencing documents and associated summaries stored. As an example, students in universities may be solicited to use the service for processing documents they may be assigned as reading/studying material in their courses in University, and the students receive the summaries free by providing such information as the University, the Professor or teacher. the course number or numbers, the name of the book or identity of other source of material that they submit for summarization, and so forth; any and all information about the information to be summarized.

In this example server 110 and/or repository 113 is enabled by software to store the information documents and the summaries, and to organize the information cross-referenced. After a period of time preparing and storing and providing such summaries back to requesting clients, it may be that a client might request a summary for a document that has already been summarized, and the document and its summary in several forms may be in repository 113. The server software may search the repository as a prelude in any request for summarization, and if the document is already there with summaries, may simply access the already-available material.

At another point in time the cross-referenced information stored in repository 113 may become so comprehensive that clients from universities may be able to access enterprise 102 and request a catalogue of contents based on a course number at a university, a professor's name, and the like, and the available information may be readily provided. Professors and teachers may also access information from such a cross-referenced source as an aid in their teaching work loads.

In addition, user generated feedback (including comments, reviews, and other addendums or types of feedback) may be stored on the server and linked to the respective summarized document.

In another aspect, similar to the example above, cross-referenced data may be categorized into a broad variety of subsets by application, by origin, by almost any useful criteria, and the developed collection then becomes very useful to a wide variety of companies, government organizations, politicians, religious leaders, and the like.

The methods and apparatus of the present invention may be practiced using all of or some of the components described without departing from the spirit and scope of the present invention. The invention may be practiced over the Internet network and any connected sub networks including wireless cells having a routed connection to the Internet. The spirit and scope of the present invention shall be limited only by the claims that follow.

What is claimed is:

1. A summarization system, comprising:
   an Internet-connected server comprising a computerized appliance having a coupled non-transitory, machine-readable storage medium;
   software executing on the computerized appliance from the non-transitory, machine-readable medium, the software providing:
   a function receiving a live or recorded stream of voice content having subject matter and meanings to be summarized, along with source information identifying a location where the material was originally acquired;
   a converter function converting the acquired material to machine-readable text form, if not in that form when acquired;
   a summarizer function creating a summary simultaneously while receiving the content, the summary having a format, condensing the summary on a scale of percentage of the whole of the content while maintaining the subject matter and meanings of the original; and
   a data repository storing a text copy of the received content and the summary created as separate files, associated and cross-referenced using the source information;
   wherein the software detects a shift of content during summarization and the format of the summary is revised based upon the detected shift.

* * * * *